United States Patent [19]

Francis et al.

[11] Patent Number: 4,839,562
[45] Date of Patent: Jun. 13, 1989

[54] ELECTRICAL DEVICES

[76] Inventors: Colin R. Francis, Bellegreve House, Les Banques, St. Peter Port, Guernsey, C.I., Channel Islands; Wojciech W. Giller, Le Friquet a Driot, Sausmarez Rd., St. Martins, Guernsey C.I., Channel Islands

[21] Appl. No.: 854,849

[22] Filed: Apr. 22, 1986

[51] Int. Cl.[4] .............................................. H05B 37/02
[52] U.S. Cl. ..................................... 315/149; 315/134; 315/158; 315/360; 315/129
[58] Field of Search ............... 315/129, 134, 149, 158, 315/300, 361, 307, 363, 363, 308, 209 R, 159

[56] References Cited

U.S. PATENT DOCUMENTS

| 3,401,265 | 9/1968 | Dotto | 315/158 X |
| 3,518,485 | 6/1970 | Leathem | 315/129 |
| 3,621,269 | 11/1971 | Misencik | 250/227 |
| 4,234,878 | 11/1980 | Stark | 315/129 |
| 4,249,160 | 2/1981 | Chilvers | 315/134 |
| 4,283,661 | 8/1981 | Doty | 315/129 |

Primary Examiner—David K. Moore
Assistant Examiner—Michael Razavi
Attorney, Agent, or Firm—Harness, Dickey & Pierce

[57] ABSTRACT

The invention relates to the idea of a device which can be interposed between a lamp and its socket for a variety of purposes including control of the operation of the lamp, hazard and security status detection. In one form the device is responsive to the light's wall switch being turned off and then rapidly on again to initiate a periodic energization of the lamp so as to give the impression that the room in which the lamp is located is occupied. Various other uses for the device are also disclosed.

1 Claim, 6 Drawing Sheets

ELECTRICAL DEVICES

The present invention relates to a electrical device and, more specifically, to electrical devices which perform control and/or monitoring/alarm functions.

According to a first aspect of the invention, there is provided an electrical device comprising a body adapted to be interposed between a light and light socket, the body containing electronic circuitry having a number of operating modes and effective to control the energisation of the light and including means for determining the operation mode on the basis of the pattern of energisation of the device by the main supply delivered in use via said socket and wherein in one mode of operation, the light output of the lamp is reduced as compared with that of another mode of operation.

Thus in one mode the light is operated at full power, and, in another mode, at reduced power; one application of this concept is the provision of a remote-controlled nightlight. In those circumstances, the circuitry may be arranged to provide an audible output, this being used to play the music of a nursery rhyme or to emit some other reassuring and/or soothing noise for a period after the nightlight mode is activated.

According to a second aspect of the invention, there is provided an electrical device comprising a body adapted to be interposed between a light and a light socket, the device containing alarm condition detection circuitry for monitoring a security condition or hazard condition in the environment in which the device is located. In this and/or the first aspect of the invention, the device may houses a fire, gas or smoke detector and the circuitry be arranged to provide a signal exteriorly of the device when fire or smoke is detected; the detector may be sensitive to a particular gas or gases so that, for example, the device can be used to detect the presence of poisonous or otherwise dangerous gases in the atmosphere.

In accordance with the third aspect of the invention, there is provided a system for controlling the illumination of an environment comprising a monitoring device for monitoring ambient light levels at one or more locations in an environment with an artificial lighting requirement and at least one control device which in use is remote from the monitoring device and includes circuitry arranged to control the level of energisation of a light or lights with which it is associated in accordance with a control signal transmitted by the monitoring device. Thus, the circuitry may be arranged to control the level of energisation of the light with which it is associated with a view to economising on electrical consumption. In accordance with this aspect of the invention, it is proposed that a control system comprising a device for monitoring ambient light levels at one or more locations in an environment with an artificial lighting requirement (such as a shop interior, office or factory workshop) be provided together with a number of control devices individually associated with respective lamps, the monitoring device transmitting control signals to the devices in accordance with the daylight available and ambient level lighting requirements. The monitoring device may further be arranged to record or display the saving in consumption as compared with that which would occur in the absence of the devices.

Considering the various aspects of the invention generally, where the device is providing a detecting function, the device may be used in association with a remote alarm or relay device or similar to which it transmits signals in any one of a number of suitable ways, for example, by an infra red transmitter/receiver link or by signals modulated onto the mains waveform at the detector and transmitted via the mains wiring to the remote device. According to the particular application in question, this remote device may serve a number of functions, for example providing visual and audible warnings e.g. by operating conventional fire alarm devices and/or to transmit the state of the monitored condition or an alarm signal to a location off site e.g., by use of an automatic telephone dialler.

Where, in any of the aspects of the invention, it is desired to have the device operable in a number of modes (for example in the nightlight in case it is desirable to have a night light mode of operation and a conventional mode of operation whereby the light acts as an ordinary indoor light), the device may contain circuitry to facilitate the change in mode without having to provide additional wiring or devices to control the device. Thus, for example, the circuitry may comprise circuitry responsive to the presence of a mains voltage applied to the device for selecting the mode of operation, for example the desired mode of operation may be initiated by turning the light switch associated with a light socket on, then briefly off then on again, the circuitry responding to this sequence to set up the desired mode of operation.

The invention will be further described by way of example with reference to the accompanying drawings in which.

Figure 1:
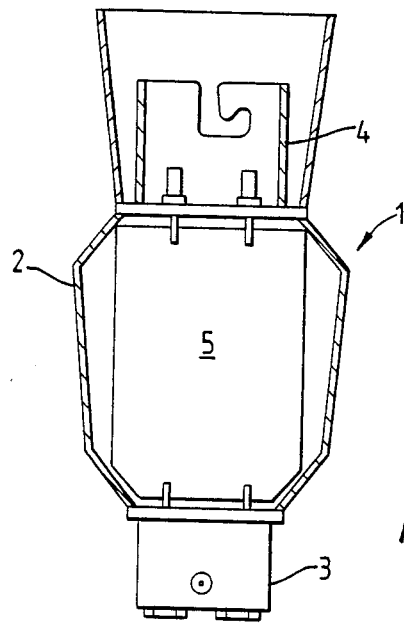
FIG. 1 is a schematic sectional view of the housing of the device used in the embodiments of FIGS. 2 to 9.

FIG. 1 shows in section the housing used in the devices of FIGS. 2 to 9. The housing comprises a body 1 of, say, plastics material having, at one end, a standard bulb fitting 2 such as a bayonet and at its other end a corresponding socket 3 whereby the device may be interposed between an existing light bulb and socket. The device is preferably of relatively short length so that it does not place the bulb so far forward as to contact any cover or the like with which the bulb may be provided. The device 1 incorporates a circuit board 4 incorporating circuitry 10 which, in some embodiments, controls the energization of a bulb B placed in the socket 3, while in others it performs other functions.

Figure 2:
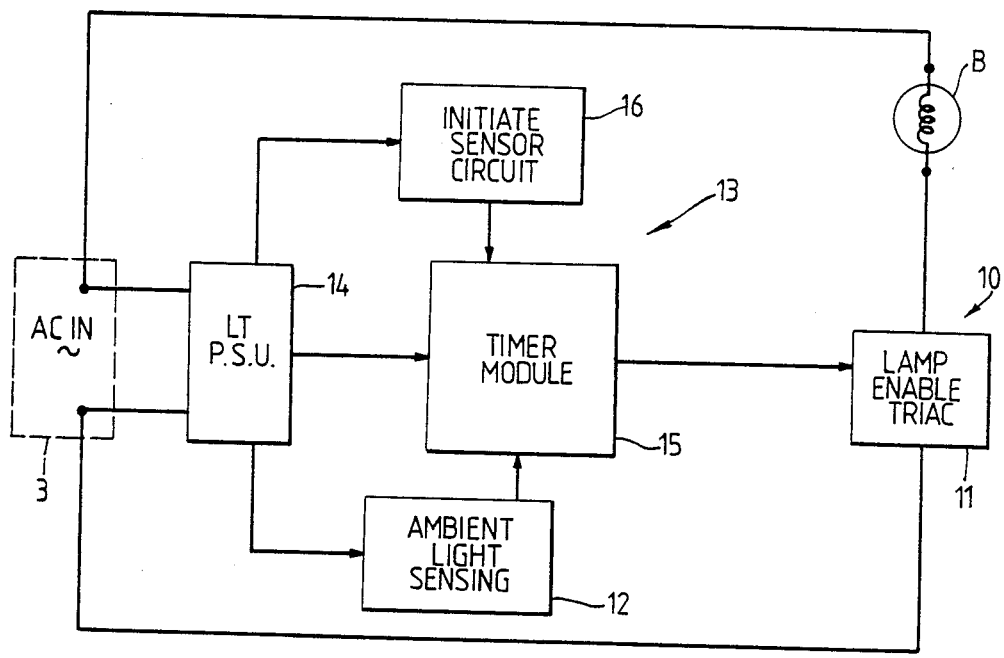
FIG. 2 is a schematic block diagram of a prior proposal of the applicants.

FIG. 2 shows in section a prior proposal of the applicants for use as a security device. Briefly, the function of the device 1 is as follows:

1. If the mains switch controlling the socket into which the device is plugged is switched on and left on, the bulb in the socket 3 comes on and stays on—in other words the presence of the device has no effect on the control of the bulb by the light switch.

2. If the mains switch is turned off turned straight back on in, say, less than a second or so, a second mode of operation occurs. In this mode, if the ambient light level, as sensed by an ambient light sensor 12 in the device is below a predetermined level the device 1 initiates a cycling energization of the bulb intended to imitate the intermittent turning on and off of the light as might be expected to occur if the premises in which the device is installed in the socket 3 comes on and stays on—in other words the presence of the device has no effect on the control of the bulb by the light switch.

3. If the mains switch is turned off and then turned straight back on in, say, less than a second or so, a second mode of operation occurs. In this mode, if the ambient light level, as sensed by an ambient light sensor 12 in the device is below a predetermined level the device 1 initiates a cycling energization of the bulb intended to imitate the intermittent turning on and off of the light might be expected to occur if the premises in which the device is installed were occupied. Thus, for example, the light may cyclically come on for say, about 10 minutes to. This cycling operation continues until either (a) the device is disarmed by turning the light switch off or (b) the ambient light level exceeds the threshold of the sensor 12 so that the light does not cycle in daylight. Other arming sequences are possible.

FIG. 2 shows in block form the circuitry required to achieve the desired mode of operation. As will be readily apparent to those skilled in the art, any one of a number of circuit configurations could be used to achieve the desired modes of operation and so FIG. 2 is merely illustrative of the general principle. The circuitry 10 comprises a controlled conduction element such as a triac 11 which controls the conduction path to the bulb B via the socket 3. The triac 11 is controlled by circuitry 13 energized by a low voltage D.C. power supply 14 connected across the mains inlet at the bayonet fitting 2.

Circuitry 13 includes a cycle timer 15 defining the desired on and off periods of energization of the bulb B in the "security" mode of operation and an ambient light sensing circuit 12 which may, for example, include a photodiode, phototransistor, light dependent resistor or any other suitable device which monitors the ambient light level (during periods when the bulb is not energised) and serves to disable the timer or override its function, and prevents the bulb B being turned on extinguished when the ambient light level exceeds a predetermined value so that the security mode of operation does not occur in daylight. An initiate-security-modes sensor circuit 16 effectively monitors the state of the on/off switch associated with the light fitting either by monitoring the A.C. input directly or the D.C. output of the power supply and is arranged to trigger 2 or enable the timer module 15 when the light switch is operated through the arming sequence (i.e. turned off and then rapidly turned on again).

Figure 3:
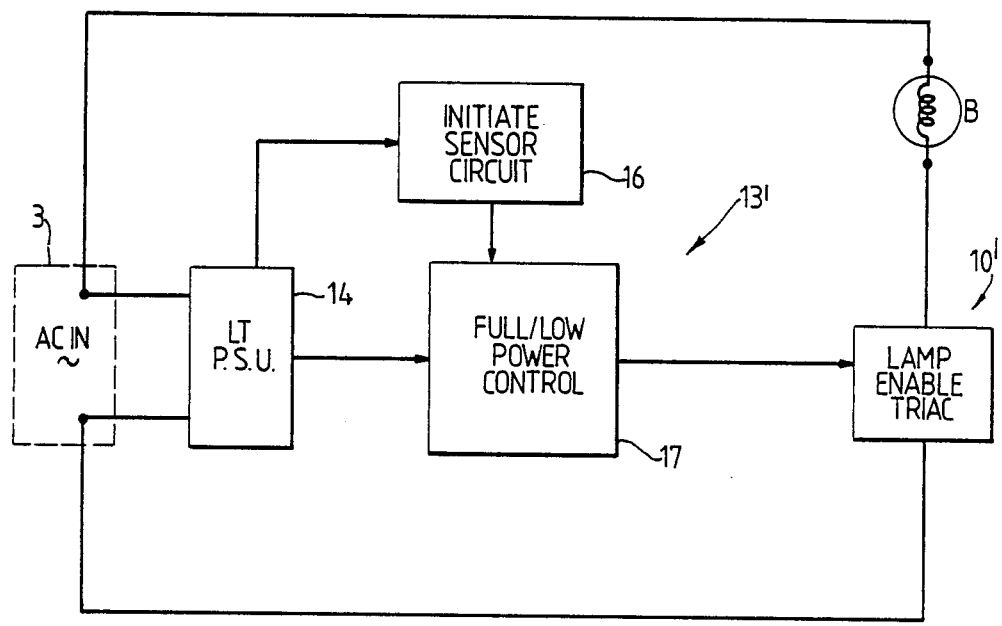
FIG. 3 is a schematic block diagram of a nightlight incorporating a first embodiment of the present invention.

FIG. 3 shows in block form the circuit diagram of an embodiment of the invention for use as a "night light" in, say, childrens' bedrooms. This embodiment operates in two modes, a normal mode initiated by switching the light switch on and leaving it on—in this mode the bulb operates at full power—and a second, "night light mode", initiated by turning the light switch off briefly and then on again and in which a power controller 20 which controls the operation of the triac 11 causing the bulb to operate as a night light at a lower power. This special mode of operation can be cancelled by turning the light switch off at the light switch. It will be seen from FIG. 3 that the ambient light sensing circuit 12 of the FIG. 1 embodiment has been omitted and the timer module replaced by the power control module. Preferably the power control module 17 and triac,11 operate in a manner which is such that in the low power "night light" mode the circuitry does not inject any substantial interference back into the main supply. Operating the triac in the conventional phase control mode, with a retarded turn-on phase angle to reduce the output power of the bulb, this interference suppression may be achieved in the conventional manner with a passive component such as an inductor.

Figure 4:
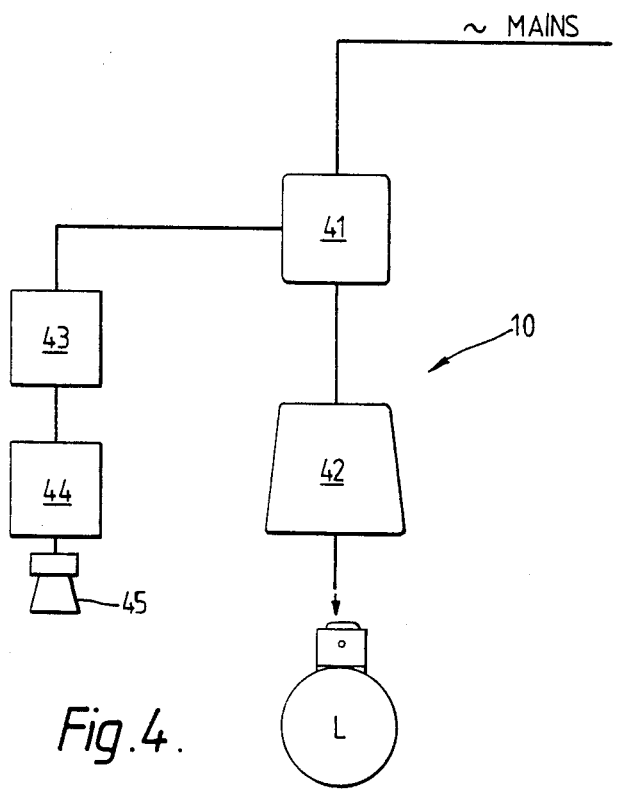
FIG. 4 is a schematic block diagram of a nightlight incorporating a second embodiment of the present invention.

FIG. 4 shows a variant of the nightlight of FIG. 3. As in the earlier version, the device 40 contains a mains interrupt sensor 41 which is arranged to detect a predetermined switching pattern of the mains supply, e.g. as in the above described embodiments, that caused by timing the lamp on, then briefly off (say for 0.5 sec) and then on again. On detection of this sequence the associated lamp L goes from normal operation to nightlight operation at, say, 50% power.

The power to the lamp is controlled by a circuit 42 responsive to detection of the arming sequence by the sensor circuit 41, circuit 42 may include a phase controlled triac or thyristor.

Also activated by the sensor 41 is a timer 43 which activates sound generator 44 for a predetermined period after the nightlight mode commences, say, 5 to 20 minutes. The sound generator drives a small loudspeaker 45 within the device 40 and may be programmed to play the tunes of nursery rhymes or to generate some other calming or soothing noise.

In this way young or nervous children who would normally be uneasy about being left in an otherwise dark room can have sufficient illumination to provide the required level of reassurance but still be able to get to sleep comfortably without having a powerful light burning in their eyes.

Figure 5:
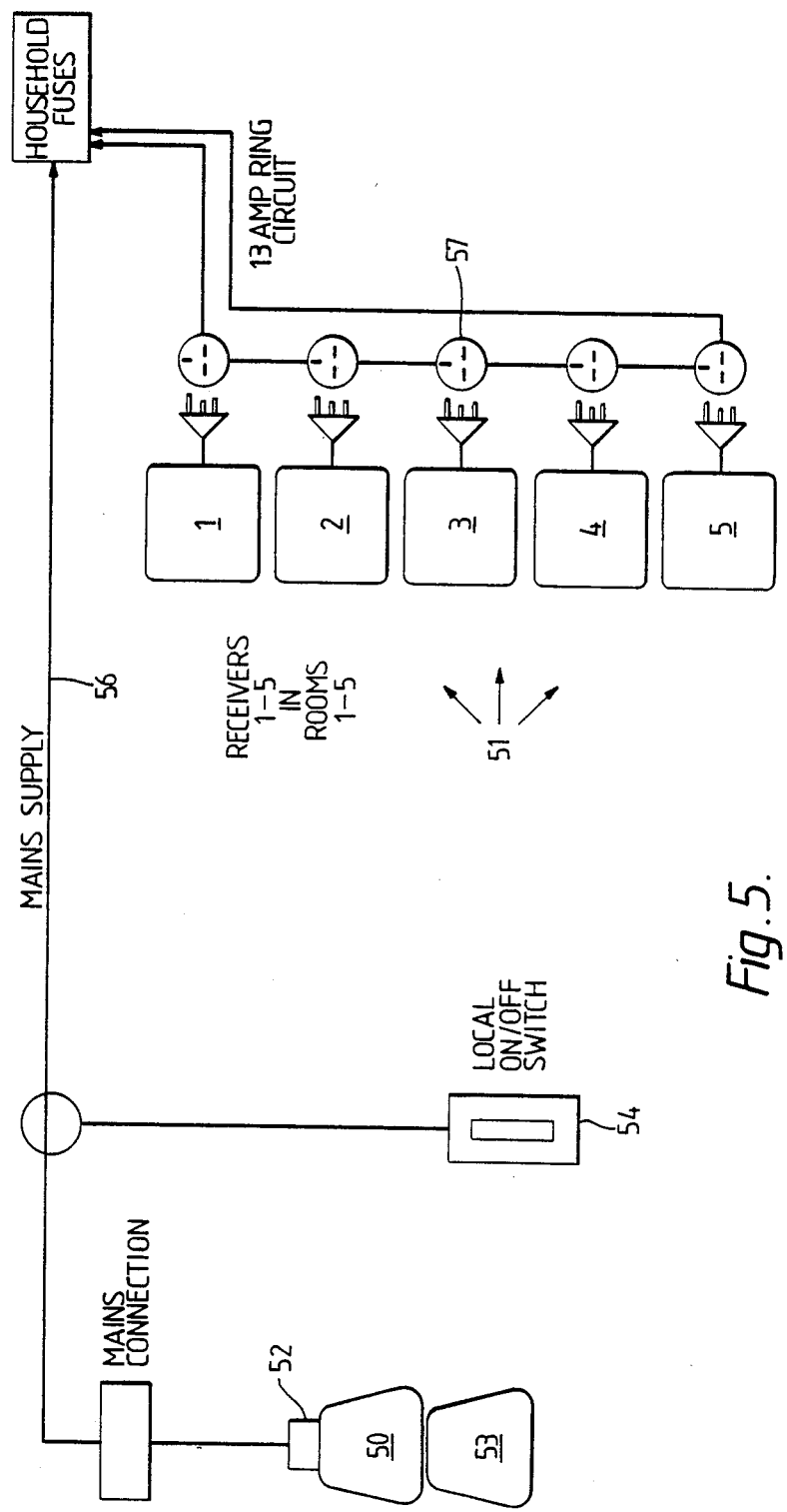
FIGS. 5 and 6A and 6B is a schematic block diagram of a fire alarm incorporating a third embodiment of the present invention.
Figure 6A:
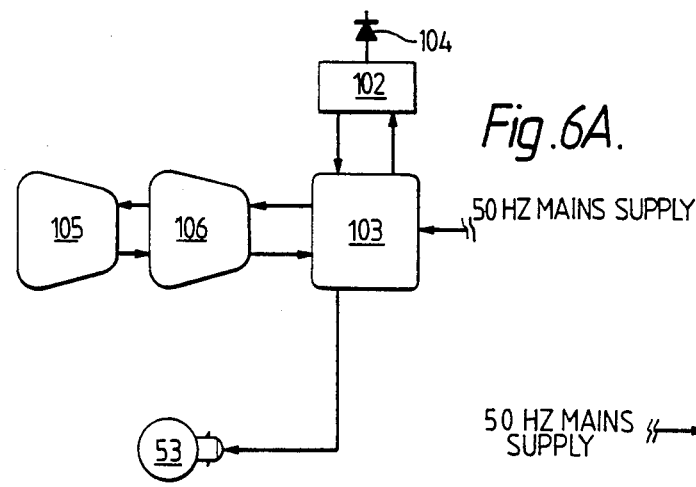
Figure 6B:
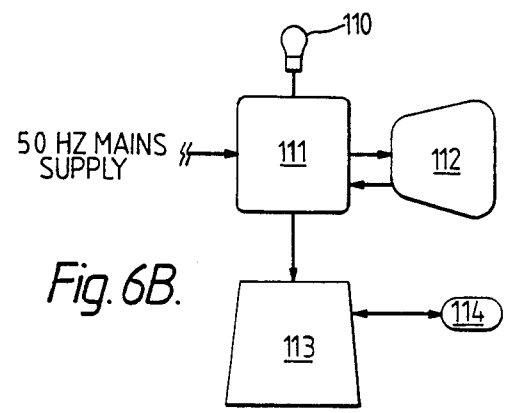

FIGS. 5 and 6A and 6B show the forms of fire or smoke detection systems incorporating devices embodying the present invention.

There are currently many smoke detection devices available which employ low drain standby current consumption from an internal battery. The life expectancy of this internal battery depends very largely on the construction of the cell having due regard for the electrolyte and the internal resistance of the cell. Relying on a battery based system is not satisfactory unless the detector is regularly checked.

Alarms intended primarily for the domestic market tend to have a rather high false alarm rate. During the course of the day in the average home a variety of other quite normal activities can result in the detector going into alarm condition e.g. cooking, painting and entertaining. In general this problem is not one of location of the detector, for plainly it is monitoring the air and it works. Neither is it one of sensitivity for there is an atmospheric change to be detected.

Additionally the detector, whilst active during the time that the household is most vulnerable is unable to arouse the sleeping occupants because the warning note from the detector is usually required to pass through at least one closed door on its way to the sleeper. Installations in Hotels and Guest Houses are required to have bells or warning devices which are clearly audible from the inside of each individual hotel room with all the corridor fire doors closed and the room door secured.

The embodiment of the invention shown in FIG. 5 used a detector in accordance with the present invention in a fire alarm system also comprising a number of receiver/alarm units 51.

The device 50 is fitted into light socket 52 after removal of the lamp 53 from the holder of the ceiling fitting in which it is to be used and the lamp 53 is then replaced.

The circuitry in device 50 is so arranged that when the fire detection function is not required, the lamp can be operated normally from the existing wall switch 54. The circuitry 101 (FIG. 6A) within the device 50 includes a circuit 102 for monitoring the incoming mains supply and a circuit 103 for deriving low voltage DC for use by the device 50 and for controlling the AC mains voltage applied to the bulb 53. In the normal, non-detection mode, the circuit 103 permits the mains supply to the bulb 53 to be controlled by the wall switch 54. To activate the detection mode, the user operates the wall switch 54 so that the bulb 53, assuming it is already switched on, is rapidly switched off then on again. This would normally be done by the last person retiring that evening and the circuit 102 is suitably designed to detect this switching pattern of the incoming mains and, in response to detecting it, to enter the detection mode.

The device 50 acknowledges this instruction by the circuit 102 causing an LED 104 to illuminate on the body of the device and the circuit 103 causing the lamp 53 in its holder to glow at approximately half strength.

At this point convection currents generated by the heat from the bulb 53 causes the air locally to be connected into ventilation holes (not shown in FIG. 1) in the body 1 of the device 50. Once inside the air is channeled into a small conventional ionisation chamber 105 where the content of the air is examined.

In the event of the chamber 103 detecting a combustion gas content and triggering an alarm condition, this condition is not made by an on board device or sounder. Instead a circuit 106 which is a mains connected coded carrier generator produces a signal to be superimposed on the mains. This coded carrier generator or transmitter causes a small, around 2 mW transmission, at, say 150 to 250 kHz to be introduced onto the mains wiring 26 to which the device is connected.

In each of the rooms occupied by the sleeping persons there is plugged one of the receivers 51. Each of these receivers is connected to a mains socket 57 and carries an illuminating lamp 110 to indicate connection. Internally the circuitry 112 of the receiver is designed to continuously monitor the incoming mains.

When the incoming means carried the coded transmission from the detector 50, the circuit 112 detects its occurrence and signals the circuitry 111 of the receiver to activate an alarm sounder 113.

On investigation of the cause of the alarm each of the remote bedside receivers can be reset by means of a simple low-profile button 114. The system is then active and until required again will remain quiescent. In the morning the system can be restored to normal 'no detection' working by simply switching off the light into which the detector 50 is plugged.

Thus by the single strategically placed detector, a number of separate highly audible sounders can be activated in five individual areas inside the building each with their doors shut and at some distance from the detector.

Additionally, in place of an air monitoring device such as a combustion gas detector, the device can incorporate a microphone connected to a speech amplifier contained within the device and a modulator for modulating the detected sounds onto a chosen carrier frequency of say between 150 kHz and 250 kHz for injection onto the mains, or say, inductively coupled transmission. At the remote point, say, the principal bedroom, a receiver could be provided capable of receiving audio information from the device and which it would demodulate to produce audio output.

An example of this application would be where the device was fitted in the bedroom of a child. In normal use the device would be electrically transparent and 'silent' The lamp, when switched on would operate normally. On application of the on-off-on switching method to instruct the device, the lamp would then dim as in a nightlight and as described above. At the same time as the dimming occurs the internal microphone and amplifier are powered causing the device to relay the audio content of the room in which it is installed. At the receiving point the modulated carrier is demodulated and the audio content input to a small local amplifier for re-amplification then to a local loudspeaker in order that a listening watch may be implemented.

Alternatively, the sounds demodulated may be fed to a circuit having a pre-determined sound level, threshold below which it does not pass the signal to an output, set by means of a fixed or variable control. This threshold of control would permit the user to govern the degree of background noise to be tolerated since in certain locations there could well be road or traffic noises which may prove a source of annoyance to the listener. The then set level, if exceeded by the cries of a small child or an infirm adult in distress, would cause the audible output to be switched on. In operation the principal would be similar to that of a squelch control on a VHF radio transceiver.

An alternative arrangement would include in the device a small radio transmitter which, when activated as before, would then transmit at a frequency approved and licenceable within the host country. The receiver in this case would be more portable and not restricted by an obligation to connect with the domestic mains supply. If however, the receiver were connected possibly to permit battery conservation or re-charging then this direct connection would serve to enhance the quality of the reception.

Figure 7:
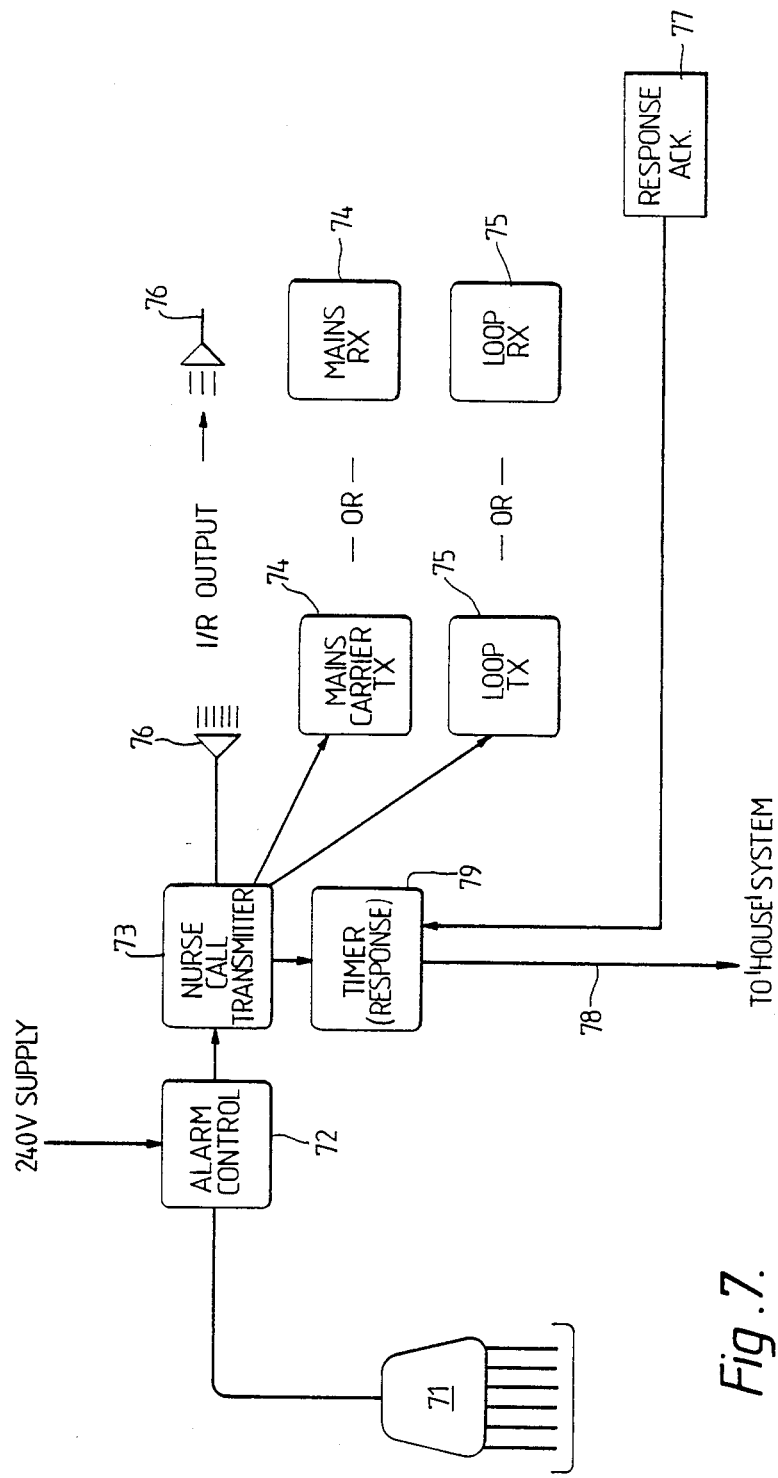
FIG. 7 is a schematic block diagram of a fire detection system incorporating a fourth embodiment of the present invention.

FIG. 7 shows a further form of smoke or fire detector for use in applications such as hospital wards. Conventional smoke, combustion gas or similar early warning systems are extremely prone to false alarm calls due mainly to the concentrated levels of air-bourne vapourised liquids, e.g. ether, used in the normal course of the hospital's activity.

The embodiment of FIG. 7 is intended to provide a single and cost-effective means of reducing problems associated with hospital-type environments.

In the system according to FIG. 7 each ward and other area to be monitored is fitted with a detector transponder (70) similar to the detector 50 of FIGS. 5 and 6.

This detector 70 is used place of the normal ward monitoring equipment. In operation the system uses an ionisation chamber 71 in the detector 70 to monitor the air and vapours air bourne in that vicinity. In the event of an alarm condition being detected the system alarm control circuit 72 energises a transmitter 73 to signal the duty ward sister who would normally be in attendance of the fact. She would then investigate the cause and should the occasion demand so break the local break-glass contact to formalise a call on the house system to summon the local fire brigade.

In essence the evaluation of threat from any given alarm would be the duty of the ward sister or staff nurse and the decision as to whether or not to call the local services would be her responsibility.

In responding to the alarm warning the duty sister would be required to acknowledge receipt of the call by depressing a button within a specified period of time, failing which the secondary system would automatically default to a normal main alarm alert.

The system of signalling to the duty sister would be by means of either a mains transponder 74 (as in FIGS. 5 and 6), an induction loop transmitter 75, an infra-red transmitter 76 or a similar device to activate a corresponding receiver (74', 75', 76') which she would normally be expected to carry about her person.

On signalling of an alarm condition, a timer 49 is activated and unless the condition is cancelled by the nurse pressing a cancel button 77 or similar arrangement before the timer times out a signal is sent via line 78 to the main alarm system capable of signalling direct to the emergency services.

In this manner all alarms would be dealt with locally and the incidence of false alarm virtually eradicated. Only genuine emergencies would result in the attendance of the emergency services but with the safety override that should an emergency crop up where the sister was completely occupied coping with it and either unable or forgetful to call for assistance then the system would automatically do so when the timer 79 times out at the expiry of the response period.

Figure 8:
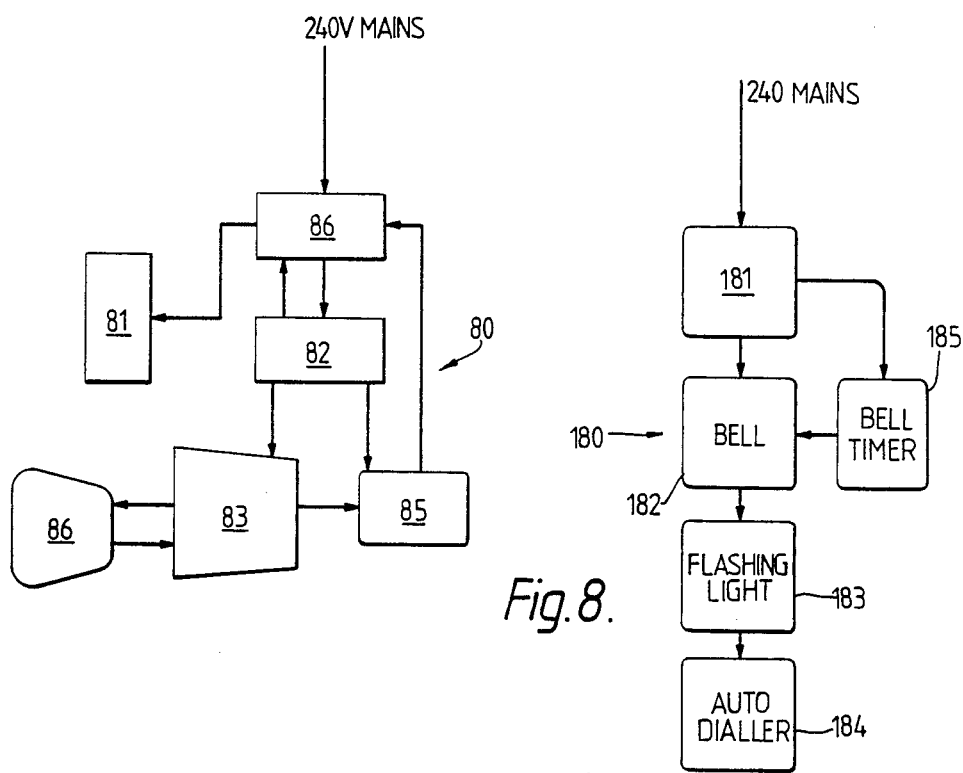
FIG. 8 is a schematic block diagram of a fire alarm system incorporating a fifth embodiment of the present invention.

FIG. 8 shows a security alarm system incorporating a device 80 according to the present invention and intended to provide a low cost user-installable system generally for use in a wide range of operational conditions.

The user installs the device 80 into a lamp socket nearest to the desired point of exit from the premises and inserts the previously removed bulb into the socket 81. On leaving the protected premises, to arm the device the owner switches on the lamp by using the normal wall switch then turns it briefly off, then on again. This switching pattern is detected by a mains interrupt sensor circuit 82 which activates an alarm module 83 which responds by emitting an audible note for say, 25 seconds during which time the owner vacates the premises; the alarm module incorporates a timer circuit to define this delay. When, at the end of this 25 second period the timer circuit times out alarm module goes automatically into the guard mode. In the device 80, a security condition sensor 84 such as a conventional infra-red motion detector monitors the security condition. If at any time during operation the detector detects an abnormal security condition e.g. movement is detected, the alarm module 83 waits, say, 25 seconds and then triggers into operation an alarm signal transmitter 85 which may, as shown be a mains carrier transmitter which injects a high frequency coded signal onto the mains supply via the devices power supply unit. This signal is picked up by a remote alarm unit 180 which may be plugged into a mains socket and which incorporates a circuit 181 to monitor the mains supply and detect and decode the alarm signal. The circuit 181 may trigger one or more alarm devices such as a bell 182, a flashing light 183 and a telephone auto dialer 184. The auto dialler may be preset or keyed to call any selected number and transmit a recorded voice message or, e.g. an electronic alarm code. The number called might well be the telephone number of the person being visited on this occasion.

Once activated the external alarm warning bell 183 will ring for a period of 30 minutes as determined by a bell timer 185 and then re-set automatically. The bell 183 may be located within the unit 180 or, more usually, be fitted exterior to the premises.

On his return the owner entering through the front door will pass into the protected area and immediately initiate the warning tone. He will then have 25 seconds to disarm the system. One way that the device 50 can be arranged to achieve this is to design the circuitry so that switching off the lamp for approximately ten seconds causes the device to cancel any alarm about to be triggered and cause the lamp to revert to normal operation. If desired the lamp switch could be key operated to provide a greater measure of security. A variety of supplementary devices could be introduced into the controlled network giving even wider domestic protection. For example additional detectors on doors or windows intruder motion detectors in other remote areas. Specific asset protection could be provided e.g. for paintings, cups, medals, items of sentimental value, even drawers or wardrobes. With other sensors a fire hazard warning could be introduced with an alternative telephone message or differing external warning note or flashing sign expansion.

Figure 9:
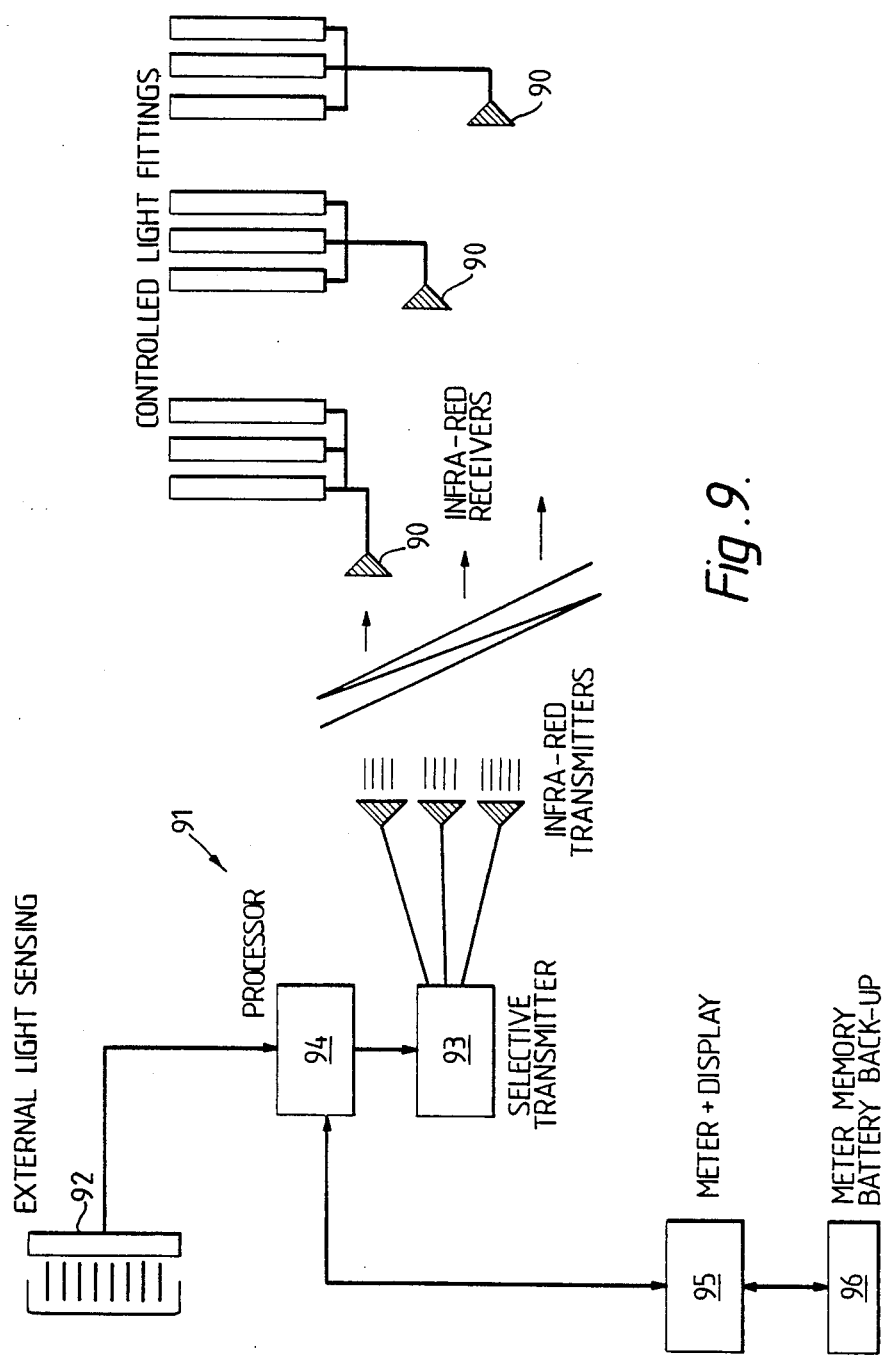
FIG. 9 is a schematic block diagram of a lighting control system incorporating a sixth embodiment of the present invention.

FIG. 9 shows a system for economising on the electricity consumption of interior lighting.

Particularly in the case of shops and stores, the lighting in operation is frequently in excess of the minimum necessary to maintain the required lighting levels, principally because of the time and effort which would be required to turn lights on and off as required manually. The system of FIG. 9 is intended to carry out this control automatically and thereby make it possible to maintain a desired lighting level with the minimum use of electric lights. In the case of an installation where say 20 kw of energy was normally being consumed to illuminate the ground floor of a large department store it might well be possible to extinguish in the region of 25% of the lighting input or (i.e. reduce the power by 5 KW) without noticable degradation in lighting or detriment to the users or staff of the store. It is possible to design-into the illustrated system controlling factors which will at all times maintain the minimum levels required by the various regulators and of course levels required to maintain sales interest and safety to customers.

With a 25% saving of the load on one floor of approximately 20 kw, the effective saving is in the region of 5 kw per hour. This multiplied over several floors of a very large department store could might achieve a saving during the summer or on normally bright periods amounting to as much as 20 or 30 kw measured over several hours in any one day. Even at industrial supply rates a saving of this order during a average period of three hours daily over six working days will soon become considerable amount of units. Prior to installation of the system a survey should be carried out of the present peak and desirable lighting conditions. Having identified lights suitable for control, a control device 90 is then installed on each of the associated light fittings. The device can be in the form shown in FIG. 1 and contain circuitry including a controlled conduction semiconductor element such as a thyristor or triac to control the operation of the associated light, on a continuously variable, stepped or on/off basis. The circuitry further includes a receiver for receiving control commands from a strategically placed central control and transmitting unit 91, via an infra-red or mains carrier transmission system.

In the case of the infra-red system, the device 90 would have on its exterior in infra-red sensor oriented so as to point towards the unit 90.

The unit 90 has one or more strategically sited light sensors which continuously monitor the externally available light. As predetermined levels or distributions of levels around the monitored area are reached in increment or decrement the transmitter 93 of the device emits signals so that appropriate ones the lights under control are caused to illuminate or extinguish. This control is carried out by a suitably programmed microprocessor 94.

At all times the lights are under the control of the CPU or processor 94 which during times of saving i.e. when fittings were switched off would monitor the saving calculated in kwh and display such saving on a digital readout or display 95.

At various intervals during the year, say, to coincide with the electricity supply board measurements, the saving recorded in a non volatile memory 96 is then presented as an account which would approximate to 50% of the saving made during the period covered. The memory 96 could be a battery-backed RAM.

The savings meter could easily be installed in a position where it was always available for inspection by management or the installing company.

This type of system could readily be considered as viable in almost any office industrial or commercial environment where the client was a large user and where such saving would represent a significant sum in the premises management.

In a smaller version e.g. for domestic purposes simple lamp control could be applied without recording or displaying the cost saving.

It will be appreciated that the above embodiments are merely illustrative and that many variations are possible within the scope of the various aspects of the invention.

Details of specific circuits for carrying out the described functions in the above described embodiments have not been given since, as will be apparent to those skilled in the art many different circuits achieving the desired function could be used. For example, to provide the mains interruption detector circuit, it is possible to provide a monostable circuit with a short-term power supply (e.g. a charged capacitor) and arrange that the monostable is triggered by the mains supply (or a DC potential derived from the main supply) being interrupted and have a bistable circuit which is set if when the mains supply is reconnected, the monostable has not yet timed out. Other arrangements are possible whereby the "off time" is monitored by the progressive decline in voltage across a discharging capacitor, with the voltage remaining when the mains is reconnected determining which mode of operation the device should enter.

Although in the above, reference has been made to transmission of signals via the electrical mains wiring figures of from 150 to 250 kHz, it will be appreciated that these figures are simply examples and any frequency suitable for transmission over the electrical mains wiring and complying with local regulations may be used.

We claim:

1. An electrical device comprising a body adapted to be interposed between a light bulb and a light socket and having an electrical connector for insertion into the light socket to receive electrical power therefrom and an electrical socket for receiving the light bulb to supply electrical power thereto, the body comprising; a housing which is to be interposed between the lamp and its socket and houses electronic circuitry including bulb energisation control means arranged to detect a pattern of energisation of the device by the electrical supply comprising a predetermined series of on and off periods of the mains supply and having a number of operating modes and effective to control the energisation of the light bulk so as to be at different power levels in different ones of said operating modes and including monitoring means, responsive to a first pattern of energisation of the device by the electrical supply to said light socket into which the device is, in use inserted, to set the light output of the light bulb at a first lower level and responsive to a second pattern of energisation of the device by the electrical supply to said light socket into which, in use, the device is inserted to set the light output of the light bulb at a second power level, said first power level being lower than said second power level, and said first pattern of energisation comprising the means supply being turned off for no more than a short predetermined time and then being turned on again; and a sound producing device for producing music or other reassuring noise housed in said housing; sound energisation control means to control the energisation of the sound producing device and effective in response to the said first pattern of energisation of the device by the electrical supply to the socket as detected by the sound energisation control means to control the sound producing device to produce said music or other reassuring noise when the bulb energisation control means is operative to energize the light bulb at said first, lower, power level and is not responsive to the second pattern of energisation so that the sound producing device is not energized when the light output of the light bulb is at said second, higher, power level.

* * * * *